US008536286B2

(12) United States Patent
Wu et al.

(10) Patent No.: US 8,536,286 B2
(45) Date of Patent: Sep. 17, 2013

(54) COMPOSITE CATALYST FOR PRODUCTION OF POLYETHYLENE

(75) Inventors: Wenqing Wu, Tianjin (CN); Yongrong Yang, Zhejiang (CN); Jingdai Wang, Zhejiang (CN); Binbo Jiang, Zhejiang (CN); Guanghai Luo, Beijing (CN); Shufang Wang, Beijing (CN); Yi Wang, Tianjin (CN); Xianfong Zhang, Tianjin (CN); Guodong Han, Tianjin (CN)

(73) Assignees: China Petroleum & Chemical Corporation (CN); Zhejiang University (CN); Sinopec Engineering Incorporation (CN)

( * ) Notice: Subject to any disclaimer, the term of this patent is extended or adjusted under 35 U.S.C. 154(b) by 501 days.

(21) Appl. No.: 12/593,239

(22) PCT Filed: Mar. 28, 2008

(86) PCT No.: PCT/CN2008/000625
§ 371 (c)(1),
(2), (4) Date: Feb. 22, 2010

(87) PCT Pub. No.: WO2008/116396
PCT Pub. Date: Oct. 2, 2008

(65) Prior Publication Data
US 2010/0152397 A1   Jun. 17, 2010

(30) Foreign Application Priority Data
Mar. 28, 2007  (CN) ............... 2007 1 0091877

(51) Int. Cl.
C08F 4/06     (2006.01)
C08F 4/00     (2006.01)
C08F 2/00     (2006.01)
C08F 4/02     (2006.01)

(52) U.S. Cl.
USPC ........... 526/113; 502/113; 526/118; 526/201; 526/202; 526/203

(58) Field of Classification Search
USPC ................ 502/104, 109; 526/352, 113
See application file for complete search history.

(56) References Cited

U.S. PATENT DOCUMENTS

| | | | |
|---|---|---|---|
| 3,231,550 A | 1/1966 | Manyik et al. | |
| 3,242,099 A | 3/1966 | Manyik et al. | |
| 3,709,853 A | 1/1973 | Karapinka et al. | |
| 3,709,954 A | 1/1973 | Karol et al. | |
| 4,077,904 A | 3/1978 | Noshay et al. | |
| 5,502,124 A | 3/1996 | Crowther et al. | |
| 5,614,456 A | 3/1997 | Mink et al. | |
| 5,851,945 A | 12/1998 | Turner et al. | |
| 5,852,141 A | 12/1998 | Malinge | |
| 6,239,060 B1 * | 5/2001 | Dockter et al. ............. | 502/120 |
| 6,294,495 B1 | 9/2001 | Matsunaga | |
| 6,403,520 B1 * | 6/2002 | Hamed et al. ............. | 502/113 |
| 6,828,268 B1 | 12/2004 | McDaniel et al. | |
| 6,943,134 B2 | 9/2005 | Kuo et al. | |
| 7,019,090 B2 | 3/2006 | Malinge | |
| 7,129,302 B2 | 10/2006 | Mink et al. | |
| 7,141,632 B2 | 11/2006 | Vaughan et al. | |
| 7,223,822 B2 | 5/2007 | Abhari et al. | |
| 2003/0171208 A1 * | 9/2003 | Malinge ................ | 502/113 |
| 2004/0044154 A1 * | 3/2004 | Kuo et al. ................ | 526/113 |

FOREIGN PATENT DOCUMENTS

| | | |
|---|---|---|
| CN | 1086223 A | 5/1994 |
| CN | 1112131 A | 11/1995 |
| CN | 1148048 A | 4/1997 |
| CN | 101018815 A | 8/2007 |
| EP | 0 594 190 | 4/1994 |
| EP | 0 816 384 | 1/1998 |
| WO | WO 96/23010 | 8/1996 |
| WO | WO 97/48735 | 12/1997 |

OTHER PUBLICATIONS

International Search Report for International Application No. PCT/CN2008/00625 mailed Jul. 3, 2008.

* cited by examiner

Primary Examiner — David W Wu
Assistant Examiner — Elizabeth Eng
(74) Attorney, Agent, or Firm — Finnegan, Henderson, Farabow, Garrett & Dunner, LLP

(57) ABSTRACT

A composite catalyst useful in the production of polyethylene, which comprises at least a first catalyst and a second catalyst separated by a polymer layer, with the first catalyst and the second catalyst being identical or different, is described. A composite catalyst useful in the production of polyethylene with a broad molecular weight distribution in a single polymerization reactor, which comprises at least a first catalyst and a second catalyst separated by a polymer layer, with the first catalyst and the second catalyst being different, is also described. A process for preparing said catalysts and a process for the production of a polyethylene by using said catalysts are also described.

41 Claims, No Drawings

COMPOSITE CATALYST FOR PRODUCTION OF POLYETHYLENE

CROSS REFERENCE OF RELATED APPLICATIONS

The present application claims the benefit of the Chinese Patent Applications No. 200710091877.6, filed on Mar. 28, 2007, which is incorporated herein by reference in its entirety and for all purposes.

FIELD OF THE INVENTION

The present invention relates to a composite catalyst useful in the production of a polyethylene, comprising at least a first catalyst and a second catalyst separated by a polymer layer, with the first catalyst and the second catalyst being identical or different. In particular, the present invention relates to a composite catalyst useful in the production of a polyethylene having a broad molecular weight distribution in a single reactor. The present invention further relates to a process for preparing said catalyst and to a process for the production of a polyethylene by using said composite catalyst.

BACKGROUND OF THE INVENTION

Obtaining the ability of producing polyethylene resins having "broad" molecular weight distributions in a single reactor is one of the main directions of technological development in polyethylene catalyst field. Many research organizations and companies in the world have been studying and developing composite catalysts exhibiting different performances, in order to produce resins having "broad" molecular weight distributions in a single reactor.

U.S. Pat. No. 7,141,632 discloses a "metallocene-metallocene" composite catalyst including a good comonomer incorporating metallocene compound and a poor comonomer incorporating metallocene compound. Because the two metallocene compounds have substantially equal hydrogen response, it is possible to make use of the difference in the copolymerization ability to regulate molecular weight distribution. The produced polyethylene resins have improved mechanical and processing properties, and can be used in film application.

U.S. Pat. Nos. 5,614,456, 6,943,134 and 7,129,302 disclose "metallocene-Ziegler" composite catalysts. Under the same reaction conditions including the presence of comonomer and hydrogen, metallocene catalysts will give low molecular weight polymer having more branched chains due to their better copolymerization performance and hydrogen response, while Ziegler-Natta catalysts will give high molecular weight polymer having less branched chains due to their inferior copolymerization performance and hydrogen response. The mechanical properties of so-produced resins are not satisfactory.

Comparing Ziegler-Natta catalysts with chromium-based catalysts (also referred to as Phillips catalysts), Ziegler-Natta catalysts have better hydrogen response and inferior copolymerization performance, while chromium-based catalysts have excellent copolymerization performance but do not respond to hydrogen regulation. Thus, under the same polymerization conditions including the presence of comonomer and hydrogen, Ziegler-Natta catalysts will give polyethylene resins having extremely low to moderate molecular weights and higher densities, while chromium-based catalysts will give polyethylene resins having high molecular weights and lower densities. Unfortunately, the two catalyst systems may interfere with each other so that it is difficult to form a "Ziegler-chromium" composite catalyst on the same support. U.S. Pat. No. 6,828,268 discloses a process wherein a Ziegler-Natta catalyst and a chromium-based catalyst are used simultaneously in a single reactor. The particles of the two produced polymer resins are mixed merely "physically" but not at molecular level.

SUMMARY OF THE INVENTION

In order to overcome the problems suffered by the prior art, the inventors have engaged in research diligently. As a result, now it has been found that a composite catalyst, which can be used in the production of polyethylenes with broad molecular weight distributions and exhibits excellent performance, can be provided by, in catalyst particles, separating two or more catalysts having different performances with a polymer layer. The inventors have also found that, by introducing a polymer layer into catalyst particles to separate the same catalyst, resins having higher bulk densities can be obtained. Based on these discovers, the present invention has been made.

An object of the invention is to provide a composite catalyst for the production of a polyethylene, comprising at least a first catalyst and a second catalyst separated by a polymer layer, wherein the first catalyst and the second catalyst are identical or different.

Another object of the invention is to provide a composite catalyst for the production of a polyethylene with a broad molecular weight distribution in a single reactor, comprising at least a first catalyst and a second catalyst separated by a polymer layer, wherein the first catalyst and the second catalyst are different.

Still another object of the invention is to provide a process for preparing the catalysts of the invention.

Still another object of the invention is to provide a process for the production of a polyethylene, comprising contacting ethylene and optionally at least one α-olefin comonomer with the composite catalyst of the invention under polymerization conditions.

Still another object of the invention is to provide a process for the production of a polyethylene having a broad molecular weight distribution, comprising contacting ethylene and at least one α-olefin comonomer with the composite catalyst of the invention, in which the first catalyst and the second catalyst are different, under polymerization conditions in a single reactor.

DETAILED DESCRIPTION OF THE PREFERRED EMBODIMENTS

In the first aspect, the present invention provides a composite catalyst for the production of a polyethylene, comprising at least a first catalyst and a second catalyst separated by a polymer layer, wherein the first catalyst and the second catalyst are identical or different.

As used herein, "separated by a polymer layer" is intended to mean that a polymer layer is present in each composite catalyst particle, with one catalyst being located beneath the polymer layer and another catalyst being present in or on the polymer layer. Thus, it is possible that a first catalyst and a second catalyst "separated by a polymer layer" contact partially with each other, for example, at the interface between the catalyst beneath the polymer layer and the polymer layer.

In an embodiment, the composite catalyst of the invention consists essentially of:

a) a first catalyst supported on a support;
b) a polymer layer coated on the first catalyst-supported support; and
c) a second catalyst supported in or on the polymer layer.

In an embodiment, the composite catalyst of the invention consists of the above components a), b) and c).

The supports useful in the invention include various particulate organic or inorganic supports commonly used in the field of polyolefin catalysts. Examples of the organic support include, but are not limited to, ethylene copolymers, propylene copolymers, 4-methyl-1-pentene copolymers, polyacrylonitriles, polyvinyl alcohols, polyvinylchlorides, poly(vinylidene chloride)s, polystyrenes and styrene copolymers, preference being given to polystyrenes and styrene copolymers. Examples of the inorganic support include, but are not limited to, silica, alumina, zirconia, thoria, titania, silica-alumina, silica-magnesia, montmorillonite and combinations thereof, preference being given to silica. Further examples of the inorganic support include magnesium dihalides, preference being given to magnesium dichloride.

The catalysts comprised in the composite catalyst of the invention may be independently selected from the group consisting of metallocene catalysts, non-metallocene single site catalysts (for example, non-metallocene early transition metal catalysts including those with amide and/or phenoxide type ligands in catalyst compounds, and non-metallocene late transition metal catalysts including those with diimine or diiminepyridyl ligands in catalyst compounds), Ziegler-Natta catalysts, chromium-based catalysts (also referred to as Phillips-type catalysts), and precatalysts thereof. Thus, the term "catalyst" as used in the description and the attached claims sometimes is intended to mean a precatalyst, which catalyzes the polymerization of olefin(s) after contacting with a cocatalyst.

Metallocene catalysts are well known in the art. There is not a specific limitation to the metallocene catalysts which may be comprised in the composite catalyst of the invention.

Generally, metallocene compounds (pre-catalysts) useful in this invention include half and full sandwich compounds having one or more bulky ligands bonded to at least one metal atom. Typical metallocene compounds are generally described as compounds containing one or more bulky ligands and one or more leaving groups bonded to at least one metal atom. Typical examples of the bulky ligand include, but are not limited to, cyclopentadienyl ligands or cyclopentadienyl-type ligand structures or other similar functioning ligand structures such as a pentadienyl, a cyclooctatetraendiyl, a cyclobutadienyl, or a substituted allyl ligand. The metal atom is preferably selected from Groups 3 to 15 and/or lanthanide or actinide series of the Periodic Table of Elements. Preferably, the metal is a transition metal from Groups 3 to 12, more preferably from Groups 4, 5, and 6, and most preferably from Group 4.

In an embodiment of the invention, the metallocene compounds may be represented by the formula (I):

$$Cp_mMA_n \quad (I)$$

wherein m is 1 or 2; M is a transition metal from Group 4, 5, or 6, preferably a transition metal from Group 4, and more preferably Ti, Zr or Hf; Cp is a cyclopentadienyl-type ligand such as a cyclopentadienyl ligand, an indenyl ligand, a benzoindenyl ligand, a fluorenyl ligand, a dibenzo[b,h]fluorenyl ligand, a benzo[b]fluorenyl ligand; A is a monoanionic labile ligand such as a weak base, for example, an amine, a phosphine, an ether, a carboxylate, a diene, a hydrocarbyl having from 1 to 20 carbon atoms, hydride, a halogen, or the like, or a combination thereof; and (m+n) is equal to the valent of the metal M.

The cyclopentadienyl-type ligands may be unsubstituted or substituted with any combination of substituents R. Non-limiting examples of substituents R include linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals or combinations thereof. The substituents R have from 1 to 30 carbon atoms, and can further be substituted with a halogen or a heteroatom or the like. Non-limiting examples of hydrocarbyl substituents R include methyl, ethyl, propyl, butyl, pentyl, hexyl, cyclopentyl, cyclohexyl, benzyl, phenyl and the like, including all their isomers, for example tertiary butyl, isopropyl and the like. Non-limiting examples of substituted hydrocarbyl substituents R include fluoromethyl, trifluoromethyl, fluoroethyl, difluoroethyl, trifluoroethyl, iodopropyl, bromoethyl, bromohexyl, chlorobenzyl; hydrocarbyl substituted organometalloid radicals such as trimethylsilyl, trimethylgermyl, methyldiethylsilyl and the like; haloalkyl-substituted organometalloid radicals such as tris(trifluoromethyl)silyl, methylbis(difluoromethyl)silyl, bromomethyldimethylgermyl and the like; disubstituted boron radicals such as dimethylboron; disubstituted pnicogen radicals such as dimethylamino, dimethylphosphino, diphenylamino, diphenylphosphino, methylphenylphosphino; and chalcogen radicals such as methoxy, ethoxy, propoxy, phenoxy, methylthio, and ethylthio. Furthermore, at least two R groups, preferably two adjacent R groups, may be joined to form a ring structure having from 3 to 30 atoms selected from carbon, nitrogen, oxygen, phosphorous, silicon, germanium, aluminum, boron and combinations thereof.

When the metallocene compounds comprise two cyclopentadienyl-type ligands in one molecule, the two ligands may be bridged to each other by a bridging group. Non-limiting examples of the bridging group include divalent bridging groups containing at least one Group 13 to 16 atom such as but not limited to at least one of carbon, oxygen, nitrogen, silicon, aluminum, boron, germanium and tin atom or a combination thereof. Preferably the bridging group contains a carbon, silicon or germanium atom, and most preferably the bridging group contains at least one silicon atom or at least one carbon atom. The bridging group may also contain a substituent R as defined above including halogens. Non-limiting examples of the bridging group include R'$_2$C, R'$_2$CCR'$_2$, R'$_2$Si, R'$_2$SiCR'$_2$, R'$_2$SiSiR'$_2$, R'$_2$Ge, R'P, R'N, R'B where R' is independently hydrogen, hydrocarbyl, substituted hydrocarbyl, hydrocarbyl-substituted organometalloid radical, haloalkyl-substituted organometalloid radical, disubstituted boron radical, disubstituted pnicogen radical, substituted chalcogen radical, or halogen, or two or more R' may be joined to form a ring or ring system.

In another embodiment, the metallocene compounds useful in the invention may be represented by the formula (II):

$$CpLJMA_n \quad (II)$$

wherein M, Cp and A are as defined above for the formula (I); J is bonded to M and is a heteroatom ancillary ligand; L is a bridging group and is bonded to J and Cp; and n is integer 0, 1 or 2. In the formula (II), J is a heteroatom containing ligand. Preferably J contains a nitrogen, phosphorus, oxygen or sulfur atom, with nitrogen being most preferred. These metallocene compounds are also well known by those skilled in the art.

Examples of the metallocene compounds include, but are not limited to, dicyclopentadienylzirconium dichloride, dicyclopentadienylhafnium dichloride, di(methylcyclopentadienyl)zirconium dichloride, di(methylcyclopentadienyl)hafnium dichloride, di(butylcyclopentadienyl)zirconium dichloride, di(butylcyclopentadienyl)hafnium dichloride, di(propylcyclopentadienyl)zirconium dichloride, di(propylcyclopentadienyl)hafnium dichloride, bis(cyclopentadienyl)hafnium dimethyl, bis(cyclopentadienyl)zirconium dimethyl, ethylenebis(tetrahydroindenyl)zirconium dihydride, ethylenebis(tetrahydroindenyl)hafnium dihydride, ethylenebis(tetrahydroindenyl)zirconium dimethyl, ethylenebis(tetrahydroindenyl)hafnium dimethyl, bis(tetramethylcyclopentadienyl)zirconium diethyl, bis(tetramethylcyclopentadienyl)hafnium diethyl, bis(tetramethylcyclopentadienyl)zirconium dimethyl, bis(tetramethylcyclopentadienyl)hafnium dimethyl, dimethylsilyl(1-fluorenyl)(cyclopentadienyl)titanium dichloride, dimethylsilyl(1-fluorenyl)(cyclopentadienyl) zirconium dichloride, dimethylsilyl(1-fluorenyl)(cyclopentadienyl)zirconium dimethyl, (cyclopentadienyl)(1,3-butadiene)zirconium dimethyl, (cyclopentadienyl)(2,3-dimethyl-1,3-butadiene)zirconium dimethyl, (pentamethylcyclopentadienyl)(benzene)zirconium dimethyl, (tetramethylcyclopentadienyl)(ethylene)titanium dimethyl, dimethylsilyl(tetramethylcyclopentadienyl)(t-butylamido)zirconium dichloride, ethylene(methylcyclopentadienyl)(phenylamido)titanium dimethyl, methylphenylsilyl(indenyl)(phenylphosphido)hafnium dihydride, dimethylsilylbis(indenyl)zirconium dichloride, dimethylsilylbis(indenyl)zirconium dimethyl, diphenylsilylbis(indenyl)zirconium dichloride, diphenylsilylbis(indenyl)zirconium dimethyl, ethylenebis(indenyl)zirconium dichloride, ethylenebis(indenyl)zirconium dimethyl, methylenebis(indenyl)zirconium dichloride, and methylenebis(indenyl)zirconium dimethyl. More metallocene compounds are disclosed, for example, in CN 101018815A, U.S. Pat. No. 7,141,632 B2, U.S. Pat. No. 6,943,134 B2 and references cited therein, which are incorporated herein by reference in their entirety.

Aluminoxane can be utilized as activators of the metallocene compounds. Aluminoxanes are generally linear or cyclic oligomeric compounds containing —Al(R')—O— sub-units, where $R^1$ is a $C_1$-$C_{30}$ alkyl, for example, methyl, ethyl, propyl, butyl, pentyl, hexyl, heptyl, octyl, nonyl, and decyl. Examples of aluminoxanes include methylaluminoxane (MAO), modified methylaluminoxane (MMAO), ethylaluminoxane and isobutylaluminoxane. Alkylaluminoxanes and modified alkylaluminoxanes are suitable as activators for metallocene catalyst compounds, particularly when the abstractable ligand is a halide, alkoxide or amide. Mixtures of different aluminoxanes and modified aluminoxanes may also be used.

Aluminoxanes may be produced by the hydrolysis of the respective trialkylaluminum compound. MMAO's may be produced by the hydrolysis of trimethylaluminum and a higher trialkylaluminum such as triisobutylaluminum. MMAO's are generally more soluble in aliphatic solvents and more stable during storage. The literatures describe a variety of methods for preparing aluminoxanes and modified aluminoxanes, and the aluminoxanes and modified aluminoxanes are commercially available from many suppliers.

The aluminoxanes or modified aluminoxanes may be utilized at an amount generally employed in the art. Preferably, the molar ratio of the aluminoxanes or modified aluminoxanes to the metallocene compounds (Al/M) is in a range of from 1 to 1000, preferably from 10 to 500, and more preferably from 20 to 200.

It is also within the scope of this invention to use a neutral or ionic, ionizing or stoichiometric activator such as triperfluorophenyl boron, triperfluoronaphthyl boron, trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate, triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)-borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)-borate, N,N-dimethyl-(2,4,6-trimethylanilinium)tetrakis(2,3,4,6-tetrafluorophenyl)borate, tropillium tetrakis(2,3,4,6-tetrafluorophenyl)borate, triphenylcarbenium tetrakis(2,3,4,6-tetrafluorophenyl)borate, triphenylphosphonium tetrakis(2,3,4,6-tetrafluorophenyl)borate, triethylsilylium tetrakis(2,3,4,6-tetrafluorophenyl)borate, benzene(diazonium)tetrakis-(2,3,4,6-tetrafluorophenyl)borate, trimethylammonium tetrakis(perfluoronapthyl)borate, triethylammonium tetrakis(perfluoronapthyl)borate, tripropylammonium tetrakis(perfluoronapthyl)borate, tri(n-butyl)ammonium tetrakis(perfluoronapthyl)borate, tri(t-butyl)ammonium tetrakis(perfluoronapthyl)borate, N,N-dimethylanilinium tetrakis(perfluoronapthyl)borate, N,N-diethylanilinium tetrakis(perfluoronapthyl)borate, N,N-dimethyl-(2,4,6-trimethylanilinium) tetrakis(perfluoronapthyl)borate, tropillium tetrakis(perfluoronapthyl)borate, triphenylcarbenium tetrakis(perfluoronapthyl)borate, triphenylphosphonium tetrakis(perfluoronapthyl)borate, triethylsilylium tetrakis(perfluoronapthyl)borate, benzene(diazonium)tetrakis(perfluoronapthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis (perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(t-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene (diazonium)tetrakis(3,5-bis(trifluoromethyl)phenyl)borate, di(i-propyl)ammonium tetrakis(pentafluorophenyl)borate, dicyclohexylammonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate.

It is within the scope of this invention to use the neutral or ionic activators alone or in combination with the aluminoxane or modified aluminoxane activators.

When the composite catalyst of the invention comprises a metallocene catalyst, the metallocene catalyst is generally supported on an organic or inorganic support and used as an inner layer catalyst, on which a polymer layer is deposited, and a second catalyst is supported in or on the polymer layer. The metallocene catalyst can be contained in an amount of from 0.01 to 0.1 mmol/g support, and preferably from 0.02 to 0.06 mmol/g support.

Non-metallocene single site catalysts, such as non-metallocene early transition metal catalysts including those having amide and/or phenoxide type ligands, and non-metallocene late transition metal catalysts including those having diimine or diiminepyridyl ligands, are also well known in the art. See, for example, International Patent Publications WO 96/23010, WO 97/48735, U.S. Pat. Nos. 5,502,124, 5,851,945, 6,294,495, and EP-A2-0 816 384, which are incorporated herein by reference.

The non-metallocene single site catalysts may be used in the invention in a manner known per se. And, if used, a non-metallocene single site catalyst is generally supported on an organic or inorganic support and used as an inner layer catalyst, on which a polymer layer is deposited.

Ziegler-Natta catalysts are well known by those skilled in the art and described, for example, in Ziegler-Natta Catalysts and Polymerizations, John Boor, Academic Press, New York, 1979, which is incorporated herein by reference. Preferred Ziegler-Natta catalyst compounds have the formula $(RO)_n MX'_4$, wherein $0 \leq n \leq 4$, R is independently a $C_1$-$C_{20}$ alkyl, cycloalkyl or aryl, M is a transition metal from Groups 4 to 6, such as Ti, V or Zr, X' is chloride, bromide, or iodide.

Non-limiting examples of Ziegler-Natta catalyst compounds where M is titanium include, but are not limited to, $TiCl_4$, $Ti(OC_4H_9)_4$, $Ti(OCH_3)_4$, $Ti(OC_2H_5)_4$, $Ti(iso-propoxy)_4$, $Ti(OC_2H_5)_2Cl_2$, $Ti(OC_2H_5)Cl_3$, $Ti(OC_4H_9)_2Cl_2$, titanium trichloride quinolinolate. In a preferred embodiment, the titanium compound forms a complex with a magnesium compound and optionally an electron donor. The magnesium compound may be represented by the formula $MgX_2$, wherein X is independently a halide, and preferred magnesium compound is magnesium dichloride. The electron donor compound is ones containing a heteroatom, such as ethers, esters, amines and the like.

Non-limiting examples of vanadium catalyst compounds include vanadyl trihalide, alkoxy halides and alkoxides such as $VOCl_3$, $VOCl_2(OBu)$ and $VO(OC_2H_5)_3$; vanadium tetrahalide and alkoxy halides such as $VCl_4$, $VCl_3(OBu)$, $VCl_2(OBu)_2$; vanadium acetylacetonates and chloroacetylacetonates; and vanadyl acetylacetonates and chloroacetylacetonates. The preferred vanadium catalyst compounds are $VOCl_3$, $VCl_4$, $VOCl_2$-OR where R is a hydrocarbon radical, preferably a $C_1$-$C_{10}$ aliphatic or aromatic hydrocarbon radical, and vanadium acetylacetonates.

When contained in the composite catalyst of the invention, the Ziegler-Natta catalysts are contained in an amount, in terms of metal, of from 0.5 to 5 wt %, preferably from 1.0 to 4.0 wt %, and more preferably from 1.0 to 3.0 wt %, based on the total weight of the composite catalyst.

In general, alkyl metal compounds are utilized as activators for the Ziegler-Natta catalysts. Examples of the alkyl metal compounds include, but are not limited to, alkylaluminum compounds, alkyl lithium compounds, dialkyl zinc compounds, alkyl boron compounds, with alkylaluminum compounds being preferred, and with triethyl aluminum, triisobutyl aluminum and tri-n-hexyl aluminum being more preferred.

Another class of catalysts that can be contained in the composite catalyst of the invention is chromium-based catalyst, also referred to as Phillips-type catalyst. Conventional chromium catalyst compounds include, for example, $CrO_3$, chromocene, silyl chromate, chromyl chloride, chromium 2-ethyl-hexanoate, chromium acetylacetonate and the like. Non-limiting examples are disclosed, for example, in U.S. Pat. Nos. 3,709,853, 3,709,954, 3,231,550, 3,242,099 and 4,077,904, which are herein fully incorporated by reference. Chromium-based catalysts are well known by those skilled in the art, and many commercial products are available.

In an embodiment, a supported chromium-based catalyst on a silica support is utilized, and said catalyst may comprise chromium in an amount of from 0.05 to 5 wt %, and preferably from 0.5 to 2 wt %, based on the weight of the supported chromium-based catalyst. The silica support has generally a pore volume larger than 1.0 cc/g, preferably larger than 1.6 cc/g, more preferably larger than 1.8 cc/g, and particularly preferably larger than 2.0 cc/g, as determined by nitrogen adsorption method. The silica support has generally a BET specific surface area of at least 50 m$^2$/g, preferably at least 100 m$^2$/g, more preferably at least 200 m$^2$/g, still more preferably at least 350 m$^2$/g, and particularly preferably larger than 400 m$^2$/g.

According to one specific aspect of this embodiment, a chromium oxide-based catalyst prepared as follows is utilized. A silica support having an organochromium compound supported thereon is placed in an activating furnace, heated under nitrogen atmosphere to a temperature of from 100 to 150° C., and maintained at that temperature for 2 to 6 hours, to remove free water. Then the temperature is further enhanced to from 400 to 900° C., preferably from 500 to 850° C., and dry air is continuously introduced into the furnace for 0.5 to 50 hours, preferably for 4 to 6 hours, to oxidize the organochromium compound into Cr(VI) oxide chemically bonded to the surface of the silica support, thereby giving the chromium oxide-based catalyst. The chromium oxide-based catalyst is cooled to ambient temperature, and can then be utilized in the deposition of a polymer layer.

According to another specific aspect of this embodiment, a chromium oxide and fluoride based catalyst prepared as follows is utilized. A silica support having an organochromium compound supported thereon is placed in an activating furnace, heated under nitrogen atmosphere to a temperature of from 100 to 150° C., and maintained at that temperature for 2 to 6 hours. Then a fluoride such as ammonium tetrafluoroborate, ammonium fluoride or ammonium hexafluorosilicate, with ammonium hexafluorosilicate being preferred, is added thereto in an amount of from 0.1 to 3 wt %, and preferably from 0.5 to 1.5 wt %, based on the weight of the silica support. At said temperature, the fluoride will decompose to form hydrogen fluoride, which reacts with hydroxy groups on the surface of the silica support to form supported fluoride. The temperature is further enhanced to from 400 to 900° C., and preferably from 500 to 850° C., and dry air is continuously introduced into the furnace for 0.5 to 50 hours, and preferably for 4 to 6 hours, to form the chromium oxide and fluoride based catalyst. The chromium oxide and fluoride based catalyst is cooled to ambient temperature, and can then be utilized in the deposition of a polymer layer.

According to still another specific aspect of this embodiment, a chromium oxide and titanium based catalyst prepared as follows is utilized. A silica support having an organochromium compound supported thereon is placed in an activating furnace, heated to a temperature of from 100 to 150° C. under nitrogen atmosphere, and maintained at that temperature for 2 to 6 hours, to remove free water. Then the solids are cooled to ambient temperature and then transferred to another vessel, where the solids are mixed with a titanium compound in an alkane solvent. The titanium compound is, for example, titanium tetrachloride, tetramethyl titanate, tetraethyl titanate, tetraisopropyl titanate, tetrabutyl titanate, with tetraisopropyl titanate being preferred. The amount of the titanium compound used is from 1 to 7 wt %, and preferably from 3 to 5 wt %, based on the weight of the silica support. After the solvent is removed, the support having the titanium compound and the organochromium compound supported thereon is re-placed in an activating furnace and is heated to a temperature of from 400 to 900° C., and preferably from 500 to 850° C., and dry air is continuously introduced into the furnace for 0.5 to 50 hours, and preferably for 4 to 6 hours, to form the chromium oxide and titanium based catalyst. The chromium oxide and titanium based catalyst is cooled to ambient temperature, and can then be utilized in the deposition of a polymer layer.

According to still another specific aspect of this embodiment, a chromium oxide, titanium and fluoride based catalyst prepared as follows is utilized. The silica support having a titanium compound and an organochromium compound supported thereon, as prepared above, is placed in an activating furnace, and then ammonium tetrafluoroborate, ammonium fluoride or ammonium hexafluorosilicate is added thereto in an amount of from 0.1 to 3 wt %, and preferably from 0.5 to 1.5 wt %, based on the weight of the silica support. The temperature is enhanced to from 400 to 900° C., preferably from 500 to 850° C., and dry air is continuously introduced into the furnace for 0.5 to 50 hours, preferably for 4 to 6 hours, to form the chromium oxide, titanium and fluoride based catalyst. The chromium oxide, titanium and fluoride based catalyst is cooled to ambient temperature, and can then be utilized in the deposition of a polymer layer.

According to still another specific aspect of this embodiment, a chromium-based catalyst prepared as follows is utilized. The chromium oxide-based catalyst as prepared above is heated to a temperature of from 100 to 500° C. under nitrogen atmosphere, and then a reducing agent is added to reduce the hexavalent chromium to divalent chromium. Non-limiting examples of suitable reducing agent include $H_2$, CO, diolefins, cycloolefins and the like, with CO being preferred. In the case where an organic reducing agent is used, reaction temperature is preferably in a range of from 100 to 300° C. In the case where CO is used, reaction temperature is preferably in a range of from 450 to 500° C. The concentration of the reducing agent in nitrogen gas is generally in a range of from 6 to 10 v/v %, and reduction time is generally in a range of from 1 to 6 hours. The completion of the reduction reaction can be indicated by the change of color of the catalyst: the color of the catalyst containing supported hexavalent chromium is orange-yellow and becomes blue or gray after the reduction reaction is completed. The catalyst containing divalent chromium is cooled to ambient temperature, and can then be utilized in the deposition of a polymer layer.

In the present invention, a polymer layer is used to separate two or more catalysts, especially those of which contacting with each other is undesired. Suitable polymers used to separate the two or more catalysts are polymers having a certain polarity, namely, polymers bearing polar functional groups, for example but not limited to, hydroxyl (—OH), carboxy (—COOH), amino (—NH$_2$), carbonyl (—CO—), cyano (—CN), halo (—X), ether group (—O—), imino (—NH—), ester group (—COO—), amide group (—CO—NH—), imide group (—CO—NH—CO—), —SO—, —SO$_2$—, —O—CO—O— and the like. Examples of the polymers include, but are not limited to, regenerated cellulose, cellulose nitrate, cellulose acetate, ethyl cellulose, bisphenol-type polysulfone, poly(aryl ether sulfone), phenolphthalein-type poly(ether sulfone), poly(ether-ketone), aliphatic polyamide, poly(sulfone amide), aliphatic polyimide, aromatic polyimide, polystyrene and styrene copolymers, fluorine-containing polyimide, polyester, ethylene copolymers, propylene copolymers, 4-methyl-1-pentene copolymers, polyacrylonitrile, polyvinyl alcohol, polyvinylchloride, poly(vinylidene chloride), polydimethylsiloxane, polytrimethylsilylpropyne, polytetrafluoroethylene, poly(vinylidene fluoride), with polystyrene and styrene copolymers being preferred.

The content of the polymer material in the composite catalyst of the invention may be in a range of from about 1 to about 50 wt %, preferably from about 10 to about 45 wt %, and more preferably from about 15 to about 40 wt %, based on the total weight of the composite catalyst.

In an embodiment, the content of the individual catalyst component contained in the composite catalyst of the invention is selected so that the resultant composite catalyst gives, when used in ethylene polymerization, a polyethylene having a melt flow ratio (MFR, calculated as MI/HLMI) of from about 20 to about 1000, preferably from about 30 to about 800, and more preferably from about 40 to about 600.

In a preferred embodiment, the composite catalyst of the invention consists essentially of, and in a further preferred embodiment, consists of
 (a) a metallocene catalyst supported on an inorganic porous support, preferably on a silica support;
 (b) a polymer layer coated on the metallocene catalyst-supported support; and
 (c) a Ziegler-Natta catalyst supported in or on the polymer layer.

In a preferred embodiment, the composite catalyst of the invention consists essentially of, and in a further preferred embodiment, consists of
 (a) a chromium-based catalyst supported on an inorganic porous support, preferably on a silica support;
 (b) a polymer layer coated on the chromium-based catalyst-supported support; and
 (c) a Ziegler-Natta catalyst supported in or on the polymer layer.

In a preferred embodiment, the composite catalyst of the invention consists essentially of, and in a further preferred embodiment, consists of (a) a first Ziegler-Natta catalyst supported on an inorganic porous support such as silica or an active magnesium chloride support;

(b) a polymer layer coated on the first Ziegler-Natta catalyst-supported support; and (c) a second Ziegler-Natta catalyst supported in or on the polymer layer.

In the second aspect, the invention provides a process for preparing the composite catalyst of the invention.

In an embodiment, the process for preparing the composite catalyst of the invention comprises the steps of (i) providing a first catalyst supported on a support;

(ii) combining a solution of at least one polymer in a good solvent with the first catalyst to form a mixture;

(iii) introducing a non-solvent for the polymer to the mixture from step (ii), or evaporating the good solvent, to deposit the polymer on the first catalyst;

(iv) optionally, treating the polymer layer-deposited first catalyst with an anchoring agent;

(v) further supporting a second catalyst; and (vi) recovering the resulting catalyst.

In principle, any of methods known in the art can be used to provide the first catalyst supported on a support.

In an embodiment, it is possible to utilize a method known in the art to obtain a metallocene catalyst or a non-metallocene single site catalyst supported on a silica support as the first catalyst.

In a preferred embodiment, a metallocene catalyst supported on a silica support can be prepared as follows: a silica support is charged into a reactor, and then a solvent such as hexane or toluene is added thereto in an amount of 8 to 12 ml/g support. The resultant mixture is stirred at 40-45° C. for 10 min, and then an alkylaluminoxane is added thereto in an amount determined according to the desired molar ratio of Al to metallocene catalyst compound, and the resultant mixture is stirred at 40-45° C. for 2 hours. Then a desired amount of the metallocene catalyst compound is added, and the reaction mixture is stirred at 40-45° C. for 2 to 8 hours, preferably for 4 to 6 hours. The reaction mixture is left standing, and then the supernatant is removed. The solids are washed with hexane or toluene for 3 to 5 times and then dried until a free flowing solid powder is obtained, to give a supported metallocene catalyst. In the resulting supported metallocene catalyst, the content of the metallocene compound is in a range of from 0.01 to 0.1 mmol/g support, and preferably from 0.02 to 0.06 mmol/g support; the molar ratio of the alkylaluminoxane to the metallocene compound (in terms of the metal element) is in a range of from 1000:1 to 1:1, preferably from 500:1 to 10:1, and more preferably from 200:1 to 20:1.

Silica supports that can be used to support the metallocene catalysts or non-metallocene single site catalysts have generally an average particle size of from 5 to 100 µm, preferably from 10 to 80 µm, and more preferably from 10 to 50 µm; a BET specific surface area of from 5 to 500 $m^2/g$, preferably from 50 to 450 $m^2/g$, and more preferably from 200 to 400 $m^2/g$; a pore volume of from 0.1 to 4 cc/g, preferably from 0.5 to 3.5 cc/g, and more preferably from 1.0 to 1.8 cc/g; and an average pore diameter of from 3 to 2000 Å, preferably from 5 to 1000 Å, and more preferably from 10 to 600 Å. Prior to use, the silica supports are generally activated by placing the silica in an activating furnace; heat-treating the silica under nitrogen flow at 200 to 1000° C., preferably 300 to 800° C., more preferably 500 to 750° C., and especially preferably 600 to 700° C. for 2 to 10 hours, preferably 3 to 7 hours, and more preferably 4 to 5 hours, to reduce the content of the hydroxyl groups on the surface of the silica particles to 0.5 to 0.7 mmol/g; and then cooling the activated silica to ambient temperature. Optionally, the silica supports may be further subjected to a chemical treatment, such as an alkyl aluminum treatment, to further reduce the content of the hydroxyl groups on the surface of the silica to 0 to about 0.2 mmol/g. The activated silica is stored under inert atmosphere, for example, nitrogen atmosphere.

In another embodiment, it is possible to utilize a method known in the art to provide a supported Ziegler-Natta catalyst as the first catalyst of the composite catalyst of the invention.

In still another embodiment, it is possible to utilize a method known in the art to provide a chromium-based catalyst as the first catalyst of the composite catalyst of the invention. When discussing the first aspect of the invention hereinbefore, several methods for preparing the chromium-based catalysts on silica support are described.

A precipitation-adsorption method may be used to deposit the polymer layer on the first catalyst. The polymer materials useful in the formation of the polymer layer are as described above.

In general, at least one of the above-described polymers is dissolved in a good solvent to give a solution, and the solution is combined with the first catalyst to form a mixture; then a non-solvent for the polymer is introduced into the mixture so as to deposit the polymer on the first catalyst. As used herein, the term "good solvent" is intended to mean a solvent that is capable of dissolving the polymer material well, for example, those that can dissolve at least 1 g, preferably at least 2 g, and more preferably at least 5 g of the polymer per 100 ml of the solvent at operation temperature. Examples of suitable good solvent include, but are not limited to, n-hexane, cyclohexane, benzene, toluene, xylene, carbon tetrachloride, ethyl acetate, butanone, dichloroethane, chloroform, chlorobenzene, acetone, cyclohexanone, tetrahydrofuran (THF), carbon bisulfide, pyridine, 1,4-dioxane, dibutyl phthalate, N,N-dimethyl formamide, methanol, ethanol, n-butanol, acetic acid, formic acid, methyl phenol, phenol and the like; with n-hexane, cyclohexane, benzene, toluene and xylene being preferred, and with benzene, toluene and xylene being more preferred.

As used herein, the term "non-solvent" is intended to mean a solvent that does substantially not dissolve the polymer material, for example, those that dissolve less than 0.5 g, preferably less than 0.2 g, and more preferably less than 0.1 g of the polymer per 100 ml of solvent at operation temperature. Examples of suitable non-solvent include, but are not limited to, ethane, propane, butane, isobutane, pentane, isopentane, hexane, cyclohexane, heptane and the like, with pentane, isopentane, hexane, and cyclohexane being preferred.

In general, the polymer material is first heated under inert atmosphere to 80 to 100° C., dried under vacuum until the content of moisture is less than 100 ppm, preferably less than 10 ppm, and more preferably less than 1 ppm, and then cooled to ambient temperature. Then, under inert atmosphere, the polymer material is completely dissolved in a good solvent to form a solution. The concentration of the polymer material in the solution may be in a range of from 0.5 to 50 wt %, preferably from 1 to 40 wt %, and more preferably from 5 to 30 wt %. Prior to use, the good solvent may be subjected to a drying treatment, for example, molecular sieve adsorption drying treatment, so as to reduce the content of moisture to, for example, less than 0.5 ppm.

The combining of the polymer solution with the supported first catalyst is generally performed under inert atmosphere at ambient temperature, and the resultant mixture is generally further stirred for 10 min to 2 hours, preferably 30 to 60 min, so as to wet sufficiently the first catalyst with the polymer solution.

The introduction of the non-solvent to the mixture of the supported first catalyst and the polymer solution is generally conducted at room temperature with stirring. Of course, higher or lower temperatures can also be employed. As the amount of the introduced non-solvent increases, the polymer material will gradually separate out. Since the particles of the supported first catalyst have a polar adsorption effect, molecules of the gradually separated-out polymer material are adsorbed on the surface of the supported first catalyst particles, forming a polymer layer.

The good solvent and the non-solvent may be selected depending on the specific polymer selected so that the polymer material may be deposited on the surface of the particles of the supported first catalyst when the volume ratio of the non-solvent used to the good solvent used is in a range of from 0.05 to 20, preferably from 0.1 to 10, and more preferably from 0.3 to 5. The addition speed of the non-solvent should be controlled so that the non-solvent is added over a period of time of from about 5 min to about 20 hours, preferably from about 10 min to about 15 hours, and more preferably from about 20 min to about 10 hours. If the addition is too quick, the polymer material may quickly separate out and agglomerate, and thereby will not be adsorbed on particles of the first catalyst. If the addition is too slow, the production efficiency is poor.

After the deposition of the polymer layer on the first catalyst, the first catalyst having a polymer layer deposited thereon is optionally treated with 0.1 to 20 mmol, preferably 0.3 to 10 mmol, and more preferably 0.5 to 5 mmol of an anchoring agent, with respect to one gram of the polymer. Examples of the anchoring agent include alkylaluminum compounds, alkyl lithium compounds, alkyl zinc compounds, and alkyl boron compounds. The incorporation of the anchoring agent will aid the sequent loading of the second catalyst.

Next, the second catalyst may be supported on the polymer layer deposited on the first catalyst through any method that is suitable for supporting the selected second catalyst on a support. For example, the second catalyst may be supported on the polymer layer deposited on the first catalyst through an impregnating method. The methods suitable for supporting the various catalysts useful in the invention on a support are well known per se to those skilled in the art.

In a specific embodiment, a Ziegler-Natta catalyst may be supported on the polymer layer deposited on a first catalyst such as a supported metallocene catalyst, a supported non-metallocene single site catalyst or a supported chromium-based catalyst through a method comprising: adding a first catalyst having a polymer deposited thereon and an amount of a non-solvent for the polymer into a reactor; cooling the contents inside the reactor to below 30° C., preferably below 20° C., and more preferably below 10° C. while stirring; adding to the reactor the titanium compound(s) or the vanadium compound(s) as described above in an amount in terms of Ti or V of from 0.5 to 5 wt %, preferably from 1.0 to 4.0 wt %, and more preferably from 1.0 to 3.0 wt %, based on the total weight of the polymer and the first catalyst; stirring the reaction mixture at that temperature for 1 to 6 hours, and preferably for 2 to 4 hours; removing the supernatant at the end of the reaction; washing solid residue with the non-solvent for several times; and drying the solids inside the reactor at 20 to 120° C., preferably 20 to 80° C., and more preferably 20 to 40° C. by passing nitrogen through the reactor or by vacuumizing until a free flowing solid powder is obtained, to give the composite catalyst of the invention.

In another specific embodiment, a Ziegler-Natta catalyst may be supported on the polymer layer deposited on a first catalyst such as a supported metallocene catalyst, a supported non-metallocene single site catalyst or a supported chromium-based catalyst through a method comprising: adding a first catalyst having a polymer deposited thereon and an amount of a non-solvent for the polymer into a reactor; cooling the contents inside the reactor to below 30° C., preferably below 20° C., and more preferably below 10° C. while stirring; adding to the reactor $TiCl_4$ or $VCl_4$ in an amount in terms of Ti or V of from 0.5 to 5 wt %, preferably from 1.0 to 4.0 wt %, and more preferably from 1.0 to 3.0 wt %, based on the total weight of the polymer and the first catalyst, and simultaneously or successively, adding a magnesium compound of formula RMgX, in which R is a $C_1$-$C_{20}$ alkyl, cycloalkyl or aryl, and X is Cl, Br or I, with the molar ratio of the magnesium compound to $TiCl_4$ or $VCl_4$ being in a range of from 0.1 to 10, and preferably from 1 to 5; stirring the reaction mixture at that temperature for 1 to 6 hours, and preferably for 2 to 4 hours; removing the supernatant at the end of the reaction; washing solid residue with the non-solvent for several times; and drying the solids inside the reactor at 20 to 120° C., preferably 20 to 80° C., and more preferably 20 to 40° C. by passing nitrogen through the reactor or by vacuumizing until a free flowing solid powder is obtained, to give the composite catalyst of the invention.

In an alternative embodiment, the process for preparing the composite catalyst of the invention comprises:

(i) providing a first catalyst supported on a support;

(ii) combining the first catalyst with a solution comprising a reaction product of at least one polymer and a second catalyst in a good solvent, to form a mixture;

(iii) introducing a non-solvent for the polymer to the mixture from step (ii) or evaporating the good solvent in the mixture, to deposit the polymer and the second catalyst on the first catalyst-supported support; and (iv) recovering the resultant catalyst.

In the third aspect, the invention provides a process for the production of a polyethylene, comprising contacting ethylene and optionally at least one α-olefin comonomer with the composite catalyst of the invention under polymerization conditions.

In an embodiment of this aspect, the invention provides a process for the production of a polyethylene having a broad molecular weight distribution, comprising contacting ethylene and at least one α-olefin comonomer with the composite catalyst of the invention, in which the first catalyst and the second catalyst are different, under polymerization conditions in a single reactor.

In a specific embodiment, the process for the production of a polyethylene according to the invention comprises the steps of (i) providing the composite catalyst according to the invention;

(ii) contacting ethylene and optionally at least one α-olefin comonomer with the composite catalyst and a cocatalyst selected from the group consisting of alkylaluminum compounds, alkyl lithium compounds, alkyl zinc compounds, alkyl boron compounds and combinations thereof under polymerization conditions, to produce the polyethylene; and (iii) recovering the polyethylene produced in step (ii).

In another specific embodiment, the process for the production of a polyethylene having a broad molecular weight distribution according to the invention comprises the steps of (i) providing the composite catalyst according to the invention in which the first catalyst and the second catalyst are different;

(ii) contacting ethylene and at least one α-olefin comonomer with the composite catalyst and a cocatalyst selected from the group consisting of alkylaluminum compounds, alkyl lithium compounds, alkyl zinc compounds, alkyl boron compounds and combinations thereof under polymerization conditions in a single reactor, to produce the polyethylene; and (iii) recovering the polyethylene produced in step (ii).

The composite catalysts of the invention, for example, metallocene-Ziegler composite catalysts, chromium oxide-Ziegler composite catalysts or Ziegler-Ziegler composite catalysts, may be used for the production of polyethylene products in a single gas phase reactor or slurry reactor, alternatively, in multiple reactors in series or in parallel operated under different conditions in terms of polymerization pressure, temperature, hydrogen/ethylene ratio, comonomer/ethylene ratio and the like. It is advantageous to use the composite catalysts of the invention in a single reactor such as a gas phase stirring bed reactor or fluidized bed reactor to produce a polyethylene product with a broad molecular weight distribution.

In the polymerization process of the invention, those polymerization conditions commonly used in the art can be employed. For example, in gas phase polymerizations, reaction pressure may be in a range of from 0.5 to 5 MPa, and preferably from 1 to 3 MPa; reaction temperature may be in a range of from 30 to 150° C., preferably from 60 to 120° C., and more preferably from 90 to 110° C. Slurry polymerization processes are generally performed under a pressure of from 0.1 to about 5.0 MPa or higher, preferably from about 0.5 to about 2.0 MPa, at a temperature of from 0 to about 120° C., preferably from about 30 to about 110° C., and more preferably from about 60 to about 100° C.

A typical gas phase fluidized bed reaction system consists of a circulating gas compressor, a cooler, and a polymerization reactor where solid particles are fluidized by the circulating gas passing through the reactor. The composite catalyst of the invention is intermittently or continuously fed into the reactor, and reactants (ethylene and optional α-olefin) as well as a cocatalyst and a molecular weight regulator (preferably hydrogen gas) are continuously added into the circulating gas. Then polymerization reaction occurs in the reactor in the presence of the catalyst, forming a polyethylene. Unreacted gases are withdrawn from the top of the reactor, and are recycled to the reactor after having been compressed and cooled or sent to a torch.

When the composite catalysts of the invention are used in ethylene polymerization, alkyl metal compounds may be used as cocatalyst and/or scavenger. Examples of the alkyl metal compounds include alkylaluminum compounds, alkyl lithium compounds, alkyl zinc compounds, and alkyl boron compounds, with alkylaluminum compounds being preferred, and with triethyl aluminum, triisobutyl aluminum and tri-n-hexyl aluminum being more preferred. The amount of these alkyl metal compounds used may be selected by those skilled in the art according to the external layer second catalyst. For example, when the external layer second catalyst is a titanium-based Ziegler-Natta catalyst, the molar ratio of the alkyl metal compound to the titanium compound may be in a range of from 5:1 to 300:1, preferably from 20:1 to 250:1, and more preferably from 40:1 to 200:1.

The composite catalysts of the invention may be used in the homopolymerization of ethylene or the copolymerization of ethylene and α-olefin(s). Examples of suitable α-olefin comonomers include $C_1$-$C_{20}$ α-olefin, for example, but not limited to, propylene, butene-1, pentene-1, hexene-1, octene-1 or higher α-olefins, with butene-1, hexene-1 and octene-1 being preferred. The molar ratio of the α-olefin(s) to ethylene may be in a range of from 0.01 to 0.5, and preferably from 0.1 to 0.2.

In the ethylene polymerization of the invention, hydrogen gas may be used as a molecular weight regulator. The molar ratio of hydrogen gas to ethylene may be in a range of from 0.01 to 1.0, and preferably from 0.1 to 0.5.

By using the ethylene polymerization process of the invention, it is possible to produce a polymer having a density of from 0.925 to 0.960 g/cm$^3$, and preferably from 0.945 to 0.960 g/cm$^3$, and a high load melt index (HLMI) of from about 1 to about 200 g/10 min., and preferably from about 2 to about 100 g/10 min. By using the polymerization process of the invention, it is possible to produce a polyethylene with a broad molecular weight distribution, which polyethylene may have a MFR (MI/HLMI) of from about 20 to about 1000, preferably from about 30 to about 800, and more preferably from about 40 to about 600.

In the invention, by separating different catalysts with a polymer layer, various problems caused by mutual interference of the separated two or more catalysts are overcome. Furthermore, without limited to a specific theory, it is believed that the polymer layer impedes the contact of reactants having a relatively large molecular diameter, for example, higher α-olefins, alkyl aluminum or the like, with the first catalyst coated by the polymer layer. This brings about additional benefits when a "metallocene-Ziegler" composite catalyst (wherein a metallocene catalyst is the first catalyst coated by the polymer layer, while a Ziegler-Natta catalyst is the second catalyst supported in/on the polymer layer) or a "chromium-Ziegler" composite catalyst (wherein a chromium-based catalyst is the first catalyst coated by the polymer layer, while a Ziegler-Natta catalyst is the second catalyst supported in/on the polymer layer) according to the invention is used to produce copolymers of ethylene and α-olefin(s) having broad molecular weight distributions. In the polymerization using the "metallocene-Ziegler" composite catalyst, the metallocene catalyst coated by the polymer layer will contact with little or no α-olefin comonomer and alkyl aluminum due to the separation or impediment of the polymer layer, but preferentially with ethylene and hydrogen gas, and thus catalyzes the polymerization of ethylene to produce low molecular weight (LMW) polyethylene containing little or no comonomer-derived units, while the Ziegler-Natta catalyst will catalyze the copolymerization of ethylene and α-olefin in the presence of sufficient alkyl aluminum cocatalyst to produce high molecular weight (HMW) polyethylene containing more comonomer-derived units. Such a polyethylene with broad molecular weight distribution has desired combination of physical properties and mechanical properties. In the polymerization using the "chromium-Ziegler" composite catalyst, the chromium-based catalyst coated by the polymer layer will contact with little or no alkyl aluminum having a relatively large molecular diameter, and thus will not be affected by the alkyl aluminum, while the Ziegler-Natta catalyst will exhibit catalytic activity in the presence of sufficient cocatalyst.

Additionally, in the invention, by separating the same catalyst with a polymer layer and controlling the activity of the external layer catalyst at a lower level, it is possible to produce polyethylene resins having higher bulk densities. Without limited to a specific theory, it is believed that controlling the activity of the external layer catalyst at a lower level may effectively prevent the catalyst particles from breaking down during the polymerization, thereby obtaining more regular resin particles having higher bulk densities.

EXAMPLES

The following examples are given only for illustrating the invention, but do not make limitation to the invention in any way.

The following methods were used for measuring properties of the polyethylene resins produced in the examples:

ASTM D 1928 for measuring densities (DE) of the polyethylene resins;

ASTM D 1238 for measuring melt indexes (MI, 2.16 kg load, 190° C.) and flow indexes (HLMI, 21.6 kg load, 190° C.) of the polyethylene resins; and ASTM D 638 for measuring tensile strength of the polyethylene resins.

The following materials were used in the examples:

Silica Supports:

Silica 955 from Grace Corp., which had an average particle diameter of 40 microns, and was activated prior to use as follows: 150 Kg of silica 955 was charged into an activating furnace; with a nitrogen flow passing through the furnace at a rate of 0.24 m/s, the temperature inside the furnace was enhanced to 120° C. and maintained at that temperature for 2 hours; then the temperature was enhanced to 600° C. at a rate of 50° C./h and maintained at that temperature for 4 hours; and then the silica was cooled to ambient temperature. The treated silica had a content of surface hydroxyl groups of from 0.5 to 0.7 mmol/g, and was stored in a dry vessel under nitrogen atmosphere until it was used in the preparation of a composite catalyst.

Silica XOP 2485 (from Grace Corp.), which had an average particle diameter of 25 microns, and was activated prior to use as follows: about 350 g of the silica was charged into an activating furnace having a diameter of 50 mm; with a nitrogen flow passing through the furnace at a rate of 0.11 m/s, the temperature inside the furnace was enhanced to 120° C. and maintained at that temperature for 2 hours; then the temperature was enhanced to 600° C. at a rate of 50° C./h and maintained at that temperature for 4 hours; and then the silica was cooled to ambient temperature. The treated silica had a content of surface hydroxyl groups of from 0.5 to 0.7 mmol/g, and was stored in a dry vessel under nitrogen atmosphere until it was used in the preparation of a composite catalyst.

Silica XOP 2212 (from Grace Corp.), which had an average particle diameter of 12 microns, and had been subjected to a high temperature treatment accomplished by the manufacturer to remove surface hydroxyl groups, and which was further activated prior to use as follows: about 200 g of the silica was charged into an activating furnace having a diameter of 50 mm; with a nitrogen flow passing through the furnace at a rate of 0.06 m/s, the temperature inside the furnace was enhanced to 120° C. and maintained at that temperature for 4 hours to remove free moisture; and then the silica was cooled to ambient temperature. The treated silica was stored in a dry vessel under nitrogen atmosphere until it was used in the preparation of a composite catalyst.

Styrene-acrylic acid copolymer from Pengli Technical Development Corp., Jilin, China, having a carboxy content of 3 mmol/g polymer.

10 wt % solution of methylaluminoxane in toluene, available from Akzo Chemicals, Inc.

Example 1

Preparation of Supported Metallocene Catalysts

Under nitrogen atmosphere, 30 g of the activated silica 955 was charged into a reaction flask equipped with a stirrer, and 200 ml of isopentane was added thereto. 10 ml of 1M solution of triethyl aluminum in pentane was added to the reaction flask, and the reaction mixture was stirred for 2 hours. Nitrogen was passed through the flask to remove the solvent until a free flowing solid powder was obtained. The content of surface hydroxyl groups of the silica was reduced to 0.2-0.3 mmol/g. 100 ml of toluene was added to the reaction flask, and the contents were warmed to 40° C. Then 150 ml of 10 wt % solution of methylaluminoxane in toluene was added thereto and the contents were stirred for 3 hours. Next, to the reaction flask was added 160 ml of a solution of dicyclopentadienyl zirconium dichloride in toluene, which had a zirconium content of $7.5 \times 10^{-3}$ mmol/ml, and the reaction mixture was stirred at 40° C. for 4 hours. The stirrer was stopped to allow solids to settle, then the supernatant was removed, and the residue was washed with toluene for three times. Finally, the toluene solvent was removed under vacuum until the solids became free flowing, thereby obtaining supported metallocene catalyst A supported on silica support. This catalyst contained 0.04 mmol Zr/g silica, and had an Al/Zr ratio of 100.

Supported metallocene catalysts B and C were prepared through the same procedure as described above, except that the activated silica XOP 2485 and the activated silica XOP 2212 were used respectively to replace for the silica 955. These catalysts contained 0.04 mmol Zr/g silica, and had an Al/Zr ratio of 100.

Example 1a

Under nitrogen atmosphere, 2.33 g of the above-prepared supported metallocene catalyst A was added into a reaction flask equipped with a stirrer. To the reaction flask was added 28 ml of a solution of the styrene-acrylic acid copolymer in toluene (containing 0.025 g polymer/ml solution), and the contents were stirred at ambient temperature for 30 min. Then 50 ml of hexane was added at a rate of 1 ml/min to the reaction flask. The stirrer was stopped to allow solids to settle, then the supernatant was removed, and the residue was washed with hexane (30 ml×3). Next, hexane was removed at 70° C. with nitrogen passing through the flask until free flowing solids were obtained. The temperature inside the reaction flask was lowered to 10° C., then 20 ml of isopentane was added to the flask, and the contents were stirred for 30 min. Then 0.5 ml of 2M solution of triethyl aluminum in pentane was added slowly, and the contents were stirred for 2 hours. Next, 0.5 ml of 2M solution of butylmagmesium chloride in heptane was added to the flask and the contents were stirred for 30 min. Next, 1 ml of 1M solution of titanium tetrachloride in hexane was added dropwise into the flask, and the contents were stirred for 60 min. The stirrer was stopped to allow solids to settle, then the supernatant was removed, and the residue was washed with isopentane (30 ml×3). Next, the solvent was removed at a temperature below 30° C. while passing nitrogen through the flask until grayish free flowing solids were obtained, thereby giving a metallocene-Ziegler composite catalyst.

Gas phase polymerization: the atmosphere inside a Φ76× 700 mm fluidized bed polymerization reactor was replaced with nitrogen for several times, and then the reactor was purged with a circulating gas (CG) from a commercial plant (having the following composition by mole: 36.6% of ethylene, 16.8% of 1-butene, 7.08% of hydrogen, 34.1% of nitrogen, and 5.42% of inert alkanes) for more than 2 hours. Fresh ethylene stream and butene-1 stream were fed. The initial reaction temperature was 88° C., and total reaction pressure was 2.2 MPa, wherein the partial pressure of the circulating gas from the commercial reactor was 0.02 MPa, the partial pressure of the fresh ethylene was 1.8 MPa, and the partial pressure of butene-1 was 0.38 MPa. 10 ml of 1M solution of triethyl aluminum in pentane was fed into the reactor. Then 0.105 g of the above-prepared composite catalyst was taken into the reactor by high pressure nitrogen (3.0 MPa). After the temperature inside the reactor began to rise, heating steam or cooling water passing through the heat-exchanging jacket was regulated to control the reactor temperature ranging from 82 to 89° C. After 2 hours, the feed streams were stopped. The atmosphere inside the reactor was replaced with nitrogen, and the reactor was cooled to ambient temperature. The reactor was opened and the polymer was removed. The polymer weighed 374 g. The calculated activity of the catalyst and properties of the polyethylene resin determined according to the testing methods described-above are shown in the Table 1 below.

Example 1b

A composite catalyst was prepared following the procedure described in Example 1a, except that the amount of the supported metallocene catalyst A was changed to 3.09 g, the amount of the copolymer was changed to 1.3 g, the amount of the solution of titanium tetrachloride in hexane was changed to 1.3 ml, and the amount of the solution of butylmagnesium chloride in heptane was changed to 0.7 ml.

A gas phase polymerization was performed following the procedure described in Example 1a, and 422 g of polymer was obtained. The calculated activity of the catalyst and properties of the polyethylene resin determined according to the testing methods described-above are shown in the Table 1 below.

Example 1c

A composite catalyst was prepared following the procedure described in Example 1a, except that the amount of the supported metallocene catalyst A was changed to 2.79 g, the amount of the copolymer was changed to 1.39 g, the amount of the solution of titanium tetrachloride in hexane was changed to 1.2 ml, and the amount of the solution of butylmagnesium chloride in heptane was changed to 0.6 ml.

A gas phase polymerization was performed following the procedure described in Example 1a, and 647 g of polymer was obtained. The calculated activity of the catalyst and properties of the polyethylene resin determined according to the testing methods described-above are shown in the Table 1 below.

Example 1d

A composite catalyst was prepared following the procedure described in Example 1a, except that 3.31 g of the supported metallocene catalyst B was used to replace for the supported metallocene catalyst A, the amount of the copolymer was changed to 1.8 g, the amount of the solution of titanium tetrachloride in hexane was changed to 1.5 ml, and the amount of the solution of butylmagnesium chloride in heptane was changed to 0.75 ml.

A gas phase polymerization was performed following the procedure described in Example 1a, and 650 g of polymer was obtained. The calculated activity of the catalyst and properties of the polyethylene resin determined according to the testing methods described-above are shown in the Table 1 below.

Example 1e

A composite catalyst was prepared following the procedure described in Example 1a, except that 3.19 g of the supported metallocene catalyst C was used to replace for the supported metallocene catalyst A, the amount of the copolymer was changed to 1.9 g, the amount of the solution of titanium tetrachloride in hexane was changed to 1.3 ml, and the amount of the solution of butylmagnesium chloride in heptane was changed to 0.75 ml.

A gas phase polymerization was performed following the procedure described in Example 1a, and 682 g of polymer was obtained. The calculated activity of the catalyst and properties of the polyethylene resin determined according to the testing methods described-above are shown in the Table 1 below.

Comparative Example 1

A dual metal catalyst was prepared as follows:
6 g of the activated silica 955 was charged into a reaction flask, and then 40 ml of hexane was added thereto, to form a silica/hexane slurry. The slurry was heated to 55° C. with stirring, then 4.32 ml of 1M solution of dibutylmagnesium in heptane was added thereto, and the mixture was stirred for 1 hour. Next, 0.40 ml of n-butanol was added to the flask, and the contents were stirred for 1 hour. Next, 2.60 ml of 1M solution of titanium tetrachloride in hexane was added to the flask, and the contents were stirred for 1 hour. The solvent was removed by passing nitrogen through the flask until free flowing solids were obtained, giving catalyst A.

To another flask was added 30 ml of a solution of dicyclopentadienyl zirconium dichloride in toluene, which had a zirconium content of $7.5 \times 10^{-3}$ mmol/ml, and then 12 ml of the solution of methylaluminoxane in toluene was added at ambient temperature. The contents were stirred for 30 min to give a solution of catalyst B.

Under nitrogen atmosphere, 2 g of the catalyst A was charged into a flask having a magnetic stirring bar, and 20 ml of isopentane was added thereto. At ambient temperature, 4.5 ml of the solution of catalyst B was slowly added to the flask while stirring. The catalyst color changed to dark brown. The solvent was removed at 50-60° C. by passing nitrogen through the flask until free flowing solids were obtained.

A gas phase polymerization was performed following the procedure described in Example 1a, and 189 g of polymer was obtained. The calculated activity of the catalyst and properties of the polyethylene resin determined according to the testing methods described-above are shown in the Table 1 below.

TABLE 1

|  | Example | | | | | |
| --- | --- | --- | --- | --- | --- | --- |
|  | 1a | 1b | 1c | 1d | 1e | Comp. Ex. 1 |
| Polymer material | PSCOOH | PSCOOH | PSCOOH | PSCOOH | PSCOOH | — |
| Catalytic activity, g/g · hr | 1770 | 1918 | 2695 | 2663 | 2623 | 1450 |
| MI, g/10 min | 0.050 | 0.047 | 0.049 | 0.047 | 0.043 | 0.052 |

TABLE 1-continued

| | Example | | | | | |
|---|---|---|---|---|---|---|
| | 1a | 1b | 1c | 1d | 1e | Comp. Ex. 1 |
| HLMI, g/10 min | 6.030 | 5.676 | 5.530 | 5.141 | 4.673 | 5.110 |
| MFR | 120.6 | 120.8 | 112.9 | 109.3 | 108.3 | 98.3 |
| Density, g/cm$^3$ | 0.9408 | 0.9383 | 0.9302 | 0.9320 | 0.9338 | 0.9386 |
| Yield strength, MPa | 32 | 31 | 33 | 34 | 34 | 22 |
| Elongation at break, % | 820 | 840 | 840 | 850 | 850 | 500 |

It can be seen from the data shown in the Table 1 that, compared with the Comparative Example 1, the metallocene-Ziegler composite catalysts prepared by the process of the invention exhibit activities higher by at least 20% under the same polymerization conditions, and the produced polyethylene resins exhibit yield strengths higher by at least 40% and have melt flow ratios (MFRs) of larger than 100.

Example 1f

Under nitrogen atmosphere, 3.57 g of the supported metallocene catalyst A was added into a reaction flask equipped with a stirrer, and then 43 ml of a solution of the styrene-acrylic acid copolymer in toluene (containing 0.025 g polymer/ml solution) was added thereto. The mixture was stirred at ambient temperature for 30 min, and then 60 ml of hexane was added into the reaction flask at a rate of 1 ml/min. The stirrer was stopped to allow solids to settle, then the supernatant was removed, and the residue was washed with hexane (30 ml×3). Next, hexane was removed at 70° C. while passing nitrogen through the flask until free flowing solids were obtained. The temperature inside the reaction flask was lowered to 10° C., then 30 ml of methylene chloride was added to the flask, and the contents were stirred for 30 min. Then 2.5 ml of 1M solution of titanium 8-quinolinolate trichloride in methylene chloride was slowly added to the flask, and the contents were stirred for 30 min. Methylene chloride solvent was removed while passing nitrogen through the flask until free flowing solids were obtained, to give a metallocene-Ziegler composite catalyst.

A gas phase polymerization was performed following the procedure described in Example 1a, and 350 g of polymer was obtained. The calculated activity of the catalyst and properties of the polyethylene resin determined according to the testing methods described-above are shown in the Table 2 below.

Example 1g

A composite catalyst was prepared according to the procedure described in Example 1f, except that the amount of the supported metallocene catalyst A was changed to 3.09 g, the amount of the copolymer was changed to 1.2 g, and the amount of the solution of titanium 8-quinolinolate trichloride in methylene chloride was changed to 2.2 ml.

A gas phase polymerization was performed following the procedure described in Example 1a, and 382 g of polymer was obtained. The calculated activity of the catalyst and properties of the polyethylene resin determined according to the testing methods described-above are shown in the Table 2 below.

Example 1h

A composite catalyst was prepared according to the procedure described in Example 1f, except that the amount of the supported metallocene catalyst A was changed to 2.87 g, the amount of the polymer material was changed to 1.48 g, and the amount of the solution of titanium quinolinolate trichloride in methylene chloride was changed to 2 ml.

A gas phase polymerization was performed following the procedure described in Example 1a, and 406 g of polymer was obtained. The calculated activity of the catalyst and properties of the polyethylene resin determined according to the testing methods described-above are shown in the Table 2 below.

Example 1m

A composite catalyst was prepared according to the procedure described in Example 1f, except that 2.54 g of the supported metallocene catalyst B was used to replace for the supported metallocene catalyst A, the amount of the copolymer was changed to 1.4 g, and the amount of the solution of titanium 8-quinolinolate trichloride in methylene chloride was changed to 1.8 ml.

A gas phase polymerization was performed following the procedure described in Example 1a, and 390 g of polymer was obtained. The calculated activity of the catalyst and properties of the polyethylene resin determined according to the testing methods described-above are shown in the Table 2 below.

Example 1n

A composite catalyst was prepared according to the procedure described in Example 1f, except that 3.12 g of the supported metallocene catalyst C was used to replace for the supported metallocene catalyst A, the amount of the copolymer was changed to 1.88 g, and the amount of the solution of titanium 8-quinolinolate trichloride in methylene chloride was changed to 2.2 ml.

A gas phase polymerization was performed following the procedure described in Example 1a, and 442 g of polymer was obtained. The calculated activity of the catalyst and properties of the polyethylene resin determined according to the testing methods described-above are shown in the Table 2 below.

TABLE 2

| | Example | | | | | |
|---|---|---|---|---|---|---|
| | 1f | 1g | 1h | 1m | 1n | Comp. Ex. 1 |
| Polymer material | PSCOOH | PSCOOH | PSCOOH | PSCOOH | PSCOOH | — |
| Catalytic activity, g/g · hr | 1576 | 1591 | 1860 | 1950 | 1990 | 1450 |
| MI, g/10 min | 0.041 | 0.035 | 0.033 | 0.024 | 0.027 | 0.052 |
| HLMI, g/10 min | 5.522 | 4.92 | 4.90 | 3.61 | 4.06 | 5.110 |

TABLE 2-continued

| | Example | | | | | |
|---|---|---|---|---|---|---|
| | 1f | 1g | 1h | 1m | 1n | Comp. Ex. 1 |
| MFR | 145 | 141 | 148 | 150 | 150 | 98.3 |
| Density, g/cm$^3$ | 0.9487 | 0.9493 | 0.9502 | 0.9510 | 0.9520 | 0.9486 |
| Yield strength, MPa | 25 | 23 | 26 | 26 | 28 | 22 |
| Elongation at break, % | 650 | 560 | 550 | 580 | 570 | 500 |

It can be seen from the data shown in the Table 2 that, compared with the Comparative Example 1, the metallocene-Ziegler composite catalysts prepared by the process of the invention exhibit higher activities (higher by 9% or more) under the same polymerization conditions, and the produced polyethylene resins exhibit comparable or higher yield strengths and have melt flow ratios (MFRs) of larger than 140.

Example 2

Preparation of Ziegler-Ziegler Composite Catalysts

Supported Ziegler-Natta catalyst A was prepared as follows: 150 Kg of the activated silica 955 was charged into a catalyst preparation vessel, and then 770 L of isopentane was added thereto. At 45° C., 9 Kg of triethyl aluminum was added to the vessel with stirring, the contents were stirred for 30 min, and then isopentane was evaporated. To another vessel containing 770 L of tetrahydrofuran, 16 Kg of magnesium dichloride and 9 Kg of titanium trichloride were added, and the contents were stirred at 70° C. for 4 hours to form a solution. Then this solution was transferred to the catalyst preparation vessel, and the tetrahydrofuran solvent was removed by evaporation while stirring until dry, free flowing solids were obtained.

Example 2a

Under nitrogen atmosphere, 3.03 g of the above-prepared supported Ziegler-Natta catalyst A was added into a reaction flask equipped with a stirrer. 36.36 ml of a solution of polyvinylchloride in tetrahydrofuran (having a polyvinylchloride concentration of 0.025 g/ml) was added thereto, and the mixture was stirred at 10° C. for 15 min. Then 60 ml of hexane was added into the reaction flask at a rate of 1 ml/min. The stirrer was stopped to allow solids to settle, then the supernatant was removed, and the residue was washed with hexane (30 ml×3). Next, hexane was removed at 70° C. while passing nitrogen through the flask until free flowing solids were obtained. The temperature inside the reactor was lowered to 10° C., then 30 ml of methylene chloride was added, and the contents were stirred for 15 min. Then 1 ml of 1M solution of titanium 8-quinolinolate trichloride in methylene chloride was slowly added, and the contents were stirred for 30 min. The methylene chloride solvent was removed while passing nitrogen through the flask until free flowing solids were obtained.

Gas phase polymerization: the atmosphere inside a Φ76× 700 mm fluidized bed polymerization reactor was replaced with nitrogen for three times and then with a circulating gas from a commercial plant (having the following composition by mole: ethylene 37.1%, 1-butene 16.9%, hydrogen 6.9%, nitrogen 32.5%, and inert alkanes 6.6%) for three times, and then the reactor was purged continuously with the circulating gas for about 1 hour. Triethyl aluminum was taken into the Φ76×700 mm reactor by the circulating gas so that the triethyl aluminum concentration in the reactor reached 350 ppm. The initial reaction temperature was 87° C., and reaction pressure was 2.2 MPa. While maintaining the reaction gases to flow, 0.122 g of the above-prepared composite catalyst was taken into the reactor by high pressure nitrogen (3.0 MPa). After the reactor temperature began to rise, heating steam or cooling water passing through the heat-exchanging jacket was regulated to control the reactor temperature ranging from 86 to 89° C. After 2 hours, the feed streams were stopped. The atmosphere inside the reactor was replaced with nitrogen, and the reactor was cooled to ambient temperature. The reactor was opened and the polymer was removed. The polymer weighed 450 g. The calculated activity of the catalyst and properties of the polyethylene resin determined according to the testing methods described-above are shown in the Table 3 below.

Example 2b

A composite catalyst was prepared according to the procedure described in Example 2a, except that the amount of the supported Ziegler-Natta catalyst A was changed to 2.59 g, the amount of the copolymer was changed to 1.036 g, and the amount of the solution of titanium 8-quinolinolate trichloride in methylene chloride was changed to 0.85 ml.

A gas phase polymerization was performed following the procedure described in Example 2a, and 482 g of polymer was obtained. The calculated activity of the catalyst and properties of the polyethylene resin determined according to the testing methods described-above are shown in the Table 3 below.

Example 2c

A composite catalyst was prepared according to the procedure described in Example 2a, except that the amount of the supported Ziegler-Natta catalyst A was changed to 3.28 g, the amount of the copolymer was changed to 1.64 g, and the amount of the solution of titanium 8-quinolinolate trichloride in methylene chloride was changed to 1.0 ml.

A gas phase polymerization was performed following the procedure described in Example 2a, and 505 g of polymer was obtained. The calculated activity of the catalyst and properties of the polyethylene resin determined according to the testing methods described-above are shown in the Table 3 below.

Example 2d

A composite catalyst was prepared according to the procedure described in Example 2a, except that the amount of the supported Ziegler-Natta catalyst A was changed to 3.54 g, the amount of the copolymer was changed to 1.95 g, and the amount of the solution of titanium 8-quinolinolate trichloride in methylene chloride was changed to 1.1 ml.

A gas phase polymerization was performed following the procedure described in Example 2a, and 581 g of polymer was obtained. The calculated activity of the catalyst and properties of the polyethylene resin determined according to the testing methods described-above are shown in the Table 3 below.

Example 2e

A composite catalyst was prepared according to the procedure described in Example 2a, except that the amount of the supported Ziegler-Natta catalyst A was changed to 2.54 g, the amount of the copolymer was changed to 1.52 g, and the amount of the solution of titanium 8-quinolinolate trichloride in methylene chloride was changed to 0.8 ml.

A gas phase polymerization was performed following the procedure described in Example 2a, and 537 g of polymer was obtained. The calculated activity of the catalyst and properties of the polyethylene resin determined according to the testing methods described-above are shown in the Table 3 below.

Example 2f

Under nitrogen atmosphere, 3.0 g of the above-prepared supported Ziegler-Natta catalyst A was added to a reaction flask equipped with a stirrer. Then 12.0 ml of a solution of the styrene-acrylic acid copolymer in tetrahydrofuran (having a concentration of 0.025 g/ml) was added, and the contents were stirred at ambient temperature for 15 min. Next, 1 ml of 0.5M solution of titanium tetrachloride in hexane and 95 mg of magnesium dichloride were added to the flask, and the contents were stirred for 60 min to allow the carboxy groups in the styrene-acrylic acid copolymer to react with the titanium tetrachloride and the magnesium dichloride to form a Ziegler-Natta catalyst B. Then tetrahydrofuran was removed at 70° C. while passing nitrogen through the flask until free flowing solids were obtained, to give a composite catalyst.

A gas phase polymerization was performed following the procedure described in Example 2a, and 550 g of polymer was obtained by using 0.16 g of the above composite catalyst. The calculated activity of the catalyst and properties of the polyethylene resin determined according to the testing methods described-above are shown in the Table 3 below.

Example 2g

Preparation flasks A and B were connected. 2.6 g of the activated silica XPO 2485 was added to the preparation flask A, and purged with nitrogen for 5 min. To the flask A were added 30 ml of isopentane and, after stirring at ambient temperature for a moment, 1.8 ml of 1M solution of TEAL in isopentane. The contents were stirred at ambient temperature for 1 hour, and then the isopentane was removed by passing nitrogen through the flask until a free flowing powder was obtained. 0.3 g of the styrene-acrylic acid copolymer was added to the preparation flask B, dried at 80 to 90° C. for 6-8 hours under a nitrogen flow, and then cooled to ambient temperature. Under nitrogen atmosphere, to the flask B were added 2.8 g of $MgCl_2$ and then 30 ml of THF, and the contents were stirred at 55° C. until the styrene-acrylic acid copolymer and $MgCl_2$ were completely dissolved. Next, to the flask B was added 1.0 ml of titanium tetrachloride, and the contents were stirred for 1 hour, to allow the complexing of $MgCl_2$ and $TiCl_4$ to form a complex and possibly the reacting of the carboxy groups in the styrene-acrylic acid copolymer with the complex of $MgCl_2$ and $TiCl_4$. The contents in the flask B were transferred to the flask A, and the mixture was stirred at 55° C. for 10 min. The THF was removed by passing nitrogen through the flask A until a free flowing solid powder was obtained. The complex of $MgCl_2$ and $TiCl_4$ that was deposited directly on the silica support is deemed as the inner layer catalyst, and the complex of $MgCl_2$ and $TiCl_4$ that was supported on the styrene-acrylic acid copolymer, which coated on the silica support, is deemed as the external layer catalyst.

A gas phase polymerization was performed following the procedure described in Example 2a, and 682 g of polymer was obtained. The calculated activity of the catalyst and properties of the polyethylene resin determined according to the testing methods described-above are shown in the Table 3 below.

Example 2h

A composite catalyst was prepared according to the procedure described in Example 2g, except that the amount of the silica support XPO 2485 was changed to 2.5 g, the amount of the copolymer was changed to 0.6 g, the amount of the solution of $TiCl_4$ was changed to 0.8 ml, and 0.2 g of silica TS-610 was further used.

A gas phase polymerization was performed following the procedure described in Example 2a, and 705 g of polymer was obtained. The calculated activity of the catalyst and properties of the polyethylene resin determined according to the testing methods described-above are shown in the Table 3 below.

Comparative Example 2

The Comparative Example 2 used the above-prepared supported Ziegler-Natta catalyst A. A gas phase polymerization was performed following the procedure described in Example 2a, and 209.3 g of polymer was obtained. The calculated activity of the catalyst and properties of the polyethylene resin determined according to the testing methods described-above are shown in the Table 3 below.

TABLE 3

| | Example | | | | | | | | |
| --- | --- | --- | --- | --- | --- | --- | --- | --- | --- |
| | 2a | 2b | 2c | 2d | 2e | 2f | 2g | 2h | Comp. Ex. 2 |
| Polymer material | PVC | PVC | PVC | PVC | PVC | PS | PS | PS | — |
| Catalytic activity, g/g · hr | 1880 | 1850 | 2100 | 2640 | 2533 | 3470 | 3580 | 4190 | 1706 |
| MI, g/10 min | 1.92 | 1.85 | 1.83 | 1.74 | 1.77 | 1.90 | 1.99 | 2.1 | 2.01 |
| HLMI, g/10 min | 77.73 | 77.70 | 84.22 | 87.72 | 86.71 | 85.5 | 83.58 | 90.3 | 58.69 |
| MFR | 41 | 42 | 45 | 50 | 49 | 45 | 42 | 43 | 29.2 |
| Density, g/cm³ | 0.9330 | 0.9362 | 0.9378 | 0.94021 | 0.9403 | 0.9280 | 0.9300 | 0.9320 | 0.9220 |
| Yield strength, MPa | 11 | 11 | 12 | 12 | 13 | 12 | 12 | 12 | 8 |
| Elongation at break, % | 650 | 660 | 640 | 620 | 620 | 680 | 670 | 690 | 760 |

It can be seen from the data shown in the Table 3 that, compared with the Comparative Example 2, the Ziegler-Ziegler composite catalysts prepared by the process of the invention exhibit higher activities, and the produced polyethylenes exhibit MFRs enhanced by at least 40% and yield strengths enhanced by at least 37%. The larger melt flow ratios (MFRs) indicate that the polymers will have better processibility, and this is in favor of the sequent processing of the products and the reduction of energy consumption.

Example 3

Preparation of Chromium-Ziegler Composite Catalysts

Chromium-based catalysts were prepared as follows:
150 Kg of commercially available silica 957 (containing 0.5 wt % of Cr and having an average particle diameter of 45 microns, available from Grace Corp.) was charged into an activating furnace, and under a nitrogen flow at a rate of 0.24 m/s, the furnace was heated to 150° C. and maintained at that temperature for 4 hours. Then the temperature inside the furnace was reduced to ambient temperature. Next, 1.5 Kg of ammonium hexafluorosilicate was added from the top of the furnace, and the contents were fluidized to mix for 1 hour. Next, the temperature inside the furnace was enhanced to 800° C. at a rate of 50° C./hr, and then dry air was introduced into the activating furnace to conduct high temperature oxidation at 800° C. for 5 hours. Finally, the chromium oxide and fluoride based catalyst was cooled to ambient temperature, to give a chromium-based catalyst A.

150 Kg of commercially available silica MS 3050 (containing 1.0 wt % of Cr and having an average particle diameter of 90 microns, available from PQ Corp.) was charged into an activating furnace, and under a nitrogen flow at a rate of 0.24 m/s, the furnace was heated to 150° C. and maintained at that temperature for 4 hours. Then the contents were cooled to ambient temperature, to give a chromium-based catalyst B.

Example 3a

Under nitrogen atmosphere, 3 g of the above chromium-based catalyst A was added into a reaction flask equipped with a stirrer, and purged with nitrogen for 10 min. To the flask were added 20 ml of dry toluene and 0.5 g of the styrene-acrylic acid copolymer, and the contents were stirred at ambient temperature for 30 min to dissolve the polymer. Then 50 ml of hexane solvent was added to the reaction flask at a rate of 0.08 ml/min. The stirrer was stopped to allow solids to settle, and then the supernatant was removed. The solid residue was washed with hexane (30 ml×3), and dried at 75° C. under a nitrogen flow to remove hexane until primrose, free flowing solids were obtained. The temperature inside the flask was reduced to 10° C., and 20 ml of isopentane was added thereto, and the contents were stirred for 30 min. Then 0.5 ml of 2M solution of butylmagnesium chloride in heptane was slowly added, and the contents were stirred for 30 min. Next, 1 ml of 1M solution of titanium tetrachloride in hexane was added dropwise, and the mixture was stirred for 60 min. The stirrer was stopped to allow solids to settle, and then the supernatant was removed. The solid residue was washed with isopentane (30 ml×3), and dried at a temperature below 40° C. under a nitrogen flow to remove the solvent until yellowish gray, free flowing solids were obtained, to give a composite catalyst.

Gas phase polymerization: the atmosphere inside a Φ76× 700 mm fluidized bed polymerization reactor was replaced with nitrogen for three times, and then the reactor was purged with a circulating gas from a commercial plant (having the following composition by mole: ethylene 37.6%, 1-butene 15.5%, hydrogen 4.7%, nitrogen 35.5%, inert alkanes 6.7%) for 2 hours. Fresh ethylene stream and hydrogen stream were then fed. The initial reaction temperature was 95° C., and total reaction pressure was 2.0 MPa, wherein the partial pressure of the circulating gas was 0.5 MPa, the partial pressure of the fresh ethylene was 1.2 MPa, and the partial pressure of hydrogen was 0.3 MPa. The concentration of triethyl aluminum in the reactor was controlled at 80 ppm. Then 0.24 g of the above composite catalyst was taken into the reactor by high pressure nitrogen (3.0 MPa). After the temperature inside the reactor began to rise, heating steam or cooling water passing through the heat-exchanging jacket was regulated to control the reactor temperature ranging from 92 to 97° C. After 2 hours, the feed streams were stopped. The atmosphere inside the reactor was replaced with nitrogen, and the reactor was cooled to ambient temperature. The reactor was opened and the polymer was removed. The polymer weighed 280 g. The calculated activity of the catalyst and properties of the polyethylene resin determined according to the testing methods described-above are shown in the Table 4 below.

Example 3b

A composite catalyst was prepared according to the procedure described in Example 3a, except that the amount of the copolymer was changed to 1.0 g.

A gas phase polymerization was performed following the procedure described in Example 3a, and 310 g of polymer was obtained. The calculated activity of the catalyst and properties of the polyethylene resin determined according to the testing methods described-above are shown in the Table 4 below.

Example 3c

A composite catalyst was prepared according to the procedure described in Example 3a, except that the amount of the copolymer was changed to 1.5 g.

A gas phase polymerization was performed following the procedure described in Example 3a, and 360 g of polymer was obtained. The calculated activity of the catalyst and properties of the polyethylene resin determined according to the testing methods described-above are shown in the Table 4 below.

Example 3d

A composite catalyst was prepared according to the procedure described in Example 3a, except that the same amount of the chromium-based catalyst B was used to replace for the chromium-based catalyst A.

A gas phase polymerization was performed following the procedure described in Example 3a, and 430 g of polymer was obtained. The calculated activity of the catalyst and properties of the polyethylene resin determined according to the testing methods described-above are shown in the Table 4 below.

Example 3e

A composite catalyst was prepared according to the procedure described in Example 3a, except that the same amount of the chromium-based catalyst B was used to replace for the chromium-based catalyst A, and the amount of the copolymer was changed to 1.0 g.

A gas phase polymerization was performed following the procedure described in Example 3a, and 450 g of polymer was obtained. The calculated activity of the catalyst and properties of the polyethylene resin determined according to the testing methods described-above are shown in the Table 4 below.

Example 3f

A composite catalyst was prepared according to the procedure described in Example 3a, except that the same amount of the chromium-based catalyst B was used to replace for the chromium-based catalyst A, and the amount of the copolymer was changed to 1.5 g.

A gas phase polymerization was performed following the procedure described in Example 3a, and 480 g of polymer was obtained. The calculated activity of the catalyst and properties of the polyethylene resin determined according to the testing methods described-above are shown in the Table 4 below.

TABLE 4

|  | Example | | | | | |
| --- | --- | --- | --- | --- | --- | --- |
|  | 3a | 3b | 3c | 3d | 3e | 3f |
| Polymer material | PSCOOH | PSCOOH | PSCOOH | PSCOOH | PSCOOH | PSCOOH |
| Catalytic activity, g/g · hr | 583 | 635 | 730 | 874 | 865 | 820 |
| MI, g/10 min | 0.021 | 0.021 | 0.023 | 0.021 | 0.022 | 0.022 |
| HLMI, g/10 min | 12.1 | 11.9 | 12.7 | 12.8 | 13.2 | 12.4 |
| MFR | 580 | 570 | 560 | 600 | 587 | 576 |
| Density, g/cm$^3$ | 0.9435 | 0.9442 | 0.9450 | 0.9418 | 0.9426 | 0.9422 |
| Yield strength, MPa | 31.4 | 31.1 | 33.5 | 32.9 | 36.4 | 36.3 |
| Elongation at break, % | 600 | 610 | 610 | 620 | 620 | 618 |

It can be seen from the data shown in the Table 4 that the chromium-Ziegler composite catalysts prepared by the process of the invention may give polyethylenes having relatively large MFR and larger yield strength.

The patents, patent applications, non-patent literatures and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the appended claims.

What is claimed is:

1. A composite catalyst for production of polyethylene, comprising at least one first catalyst and at least one second catalyst separated by a polymer layer, wherein the at least one first catalyst and the at least one second catalyst are identical or different,
further wherein the polymer bears polar functional groups, and the content of the polymer ranges from 1 to 50 wt %, based on the total weight of the composite catalyst.

2. The composite catalyst according to claim 1, wherein said first catalyst is supported on a support and said second catalyst is supported in or on the polymer layer.

3. The composite catalyst according to claim 2, wherein the support is an organic support chosen from ethylene copolymers, propylene copolymers, 4-methyl-1-pentene copolymers, polyacrylonitriles, polyvinyl alcohols, polyvinylchlorides, poly(vinylidene chloride)s, polystyrenes, and styrene copolymers.

4. The composite catalyst according to claim 1, wherein the at least one first catalyst and the at least one second catalyst are different.

5. The composite catalyst according to claim 1, wherein the at least one first catalyst and the at least one second catalyst are independently chosen from Ziegler-Natta catalysts, chromium-based catalysts, metallocene catalysts, non-metallocene single site catalysts, and precatalysts thereof.

6. The composite catalyst according to claim 2, wherein
said first catalyst supported on a support comprises a metallocene catalyst supported on an inorganic porous support; and
said second catalyst supported in or on the polymer layer comprises a Ziegler-Natta catalyst supported in or on the polymer layer.

7. The composite catalyst according to claim 2, wherein
said first catalyst supported on a support comprises a chromium-based catalyst supported on an inorganic porous support; and
said second catalyst supported in or on the polymer layer comprises a Ziegler-Natta catalyst supported in or on the polymer layer.

8. The composite catalyst according to claim 2, wherein
said first catalyst supported on a support comprises a first Ziegler-Natta catalyst supported on an inorganic porous support; and
said second catalyst supported in or on the polymer layer comprises a second Ziegler-Natta catalyst supported in or on the polymer layer,
wherein the first and second Ziegler-Natta catalysts are identical or different.

9. The composite catalyst according to claim 1, wherein the content of the polymer ranges from 10 to 45 wt %, based on the total weight of the composite catalyst.

10. A process for preparing a composite catalyst according to claim 1, comprising:
(i) providing a first catalyst supported on a support;
(ii) combining a solution of at least one polymer in a good solvent with the first catalyst to form a mixture;
(iii) introducing a non-solvent for the polymer to the mixture obtained from (ii) such that the polymer precipitates and deposits on the first catalyst to form a polymer layer;
(iv) optionally, treating the polymer layer-deposited first catalyst with an anchoring agent;
(v) further depositing a second catalyst on the polymer layer-deposited first catalyst; and (vi) recovering the resultant composite catalyst,
wherein the first catalyst and the second catalyst are identical or different.

11. A process for preparing a composite catalyst according to claim 1, comprising:
(i) providing a first catalyst supported on a support;
(ii) combining the first catalyst with a solution comprising a reaction product of at least one polymer and a second catalyst in a good solvent, to form a mixture;
(iii) introducing a non-solvent for the polymer to the mixture from (ii) such that the polymer and the second catalyst deposit on the first catalyst-supported support; and
(iv) recovering the resultant composite catalyst.

12. The process according to claim 8, wherein the support is an organic support chosen from ethylene copolymers, propylene copolymers, 4-methyl-1-pentene copolymers, polyacrylonitriles, polyvinyl alcohols, polyvinylchlorides, poly(vinylidene chloride)s, polystyrenes, and styrene copolymers.

13. The process according to claim 8, wherein the first catalyst and the second catalyst are independently chosen from Ziegler-Natta catalysts, chromium-based catalysts, metallocene catalysts, non-metallocene single site catalysts, and precatalysts thereof.

14. The process according to claim 8, wherein the polymer bears polar functional groups, and the amount of the polymer used ranges from 1 to 50 wt %, based on the total weight of the composite catalyst.

15. The process according to claim 8, wherein the good solvent is chosen from n-hexane, cyclohexane, benzene, toluene, xylene, carbon tetrachloride, ethyl acetate, butanone, dichloroethane, chloroform, chlorobenzene, acetone, cyclohexanone, tetrahydrofuran, carbon bisulfide, pyridine, 1,4-dioxane, dibutyl phthalate, dimethyl formamide, methanol, ethanol, n-butanol, acetic acid, formic acid, methyl phenol, phenol, and mixtures thereof; and the non-solvent is chosen from ethane, propane, butane, isobutane, pentane, isopentane, hexane, cyclohexane, heptane, and mixtures thereof.

16. The process according to claim 8, wherein the good solvent and the non-solvent are selected depending on the specific polymer selected so that in (iii), the polymer is deposited on the first catalyst when the volume ratio of the non-solvent used to the good solvent used is from 0.05 to 20, and wherein the non-solvent is added at a controlled speed in (iii) so that the addition of the non-solvent is completed in a period of time ranging from 5 min to 20 hours.

17. The process according to claim 8, wherein the good solvent and the non-solvent are selected depending on the specific polymer selected so that in (iii), the polymer is deposited on the first catalyst when the volume ratio of the non-solvent used to the good solvent used is from 0.1 to 10, and wherein the non-solvent is added at a controlled speed in (iii) so that the addition of the non-solvent is completed in a period of time ranging from 10 min to 15 hours.

18. The process according to claim 8, wherein the good solvent and the non-solvent are selected depending on the specific polymer selected so that in (iii), the polymer is deposited on the first catalyst when the volume ratio of the non-solvent used to the good solvent used is from 0.3 to 5, and wherein the non-solvent is added at a controlled speed in (iii) so that the addition of the non-solvent is completed in a period of time ranging from 20 min to 10 hours.

19. The process according to claim 8, wherein the anchoring agent is chosen from alkylaluminum compounds, alkyl lithium compounds, alkyl zinc compounds, alkyl boron compounds, and mixtures thereof.

20. The process according to claim 8, wherein the amount of the polymer used ranges from 10 to 45 wt %, based on the total weight of the composite catalyst.

21. A process for the production of a polyethylene, comprising
(i) providing a composite catalyst according to claim 1;
(ii) contacting ethylene and optionally at least one α-olefin comonomer with the composite catalyst and a cocatalyst chosen from alkylaluminum compounds, alkyl lithium compounds, alkyl zinc compounds, alkyl boron compounds and combinations thereof under polymerization conditions, to produce the polyethylene; and
(iii) recovering the polyethylene produced in (ii).

22. The process according to claim 17, wherein the process is carried out in a gas phase reactor or a slurry reactor.

23. The process according to claim 17, wherein the α-olefin comonomer is a $C_1$-$C_{20}$ α-olefin.

24. The process according to claim 17 wherein ethylene and at least one α-olefin comonomer are copolymerized, and the molar ratio of the at least one α-olefin to ethylene ranges from 0.01 to 0.5.

25. The process according to claim 17 wherein said polyethylene has a melt flow ratio (MFR) ranging from 20 to 1000.

26. The process according to claim 17 wherein said polyethylene has a density ranging from 0.925 to 0.960 $g/cm^3$.

27. The process according to claim 17, which is carried out in a single reactor.

28. A process for the production of a polyethylene having, comprising
(i) providing a composite catalyst according to claim 4;
(ii) contacting ethylene and at least one α-olefin comonomer with the composite catalyst and a cocatalyst chosen from alkylaluminum compounds, alkyl lithium compounds, alkyl zinc compounds, alkyl boron compounds and combinations thereof under polymerization conditions in a single reactor, to produce the polyethylene; and
(iii) recovering the polyethylene produced in (ii).

29. The process according to claim 11, wherein the support is an organic support chosen from ethylene copolymers, propylene copolymers, 4-methyl-1-pentene copolymers, polyacrylonitriles, polyvinyl alcohols, polyvinylchlorides, poly(vinylidene chloride)s, polystyrenes, and styrene copolymers.

30. The process according to claim 11, wherein the support is an inorganic support chosen from magnesium dihalides, silica, alumina, zirconia, thoria, titania, silica-alumina, silica-magnesia, montmorillonite, and combinations thereof.

31. The process according to claim 11, wherein the first catalyst and the second catalyst are independently chosen from Ziegler-Natta catalysts, chromium-based catalysts, metallocene catalysts, non-metallocene single site catalysts, and precatalysts thereof.

32. The process according to claim 11, wherein the polymer bears polar functional groups, and the amount of the polymer used ranges from 1 to 50 wt %, based on the total weight of the composite catalyst.

33. The process according to claim 11, wherein the good solvent is chosen from n-hexane, cyclohexane, benzene, toluene, xylene, carbon tetrachloride, ethyl acetate, butanone, dichloroethane, chloroform, chlorobenzene, acetone, cyclohexanone, tetrahydrofuran, carbon bisulfide, pyridine, 1,4-dioxane, dibutyl phthalate, dimethyl formamide, methanol, ethanol, n-butanol, acetic acid, formic acid, methyl phenol, phenol, and mixtures thereof; and the non-solvent is chosen from ethane, propane, butane, isobutane, pentane, isopentane, hexane, cyclohexane, heptane, and mixtures thereof.

34. The process according to claim 11, wherein the volume ratio of the non-solvent used to the good solvent used ranges from 0.05 to 20, and wherein the non-solvent is added at a controlled speed in (iii) so that the addition of the non-solvent is completed in a period of time ranging from 5 min to 20 hours.

35. The process according to claim 11, the volume ratio of the non-solvent used to the good solvent used is from 0.1 to 10, and wherein the non-solvent is added at a controlled speed in (iii) so that the addition of the non-solvent is completed in a period of time ranging from 10 min to 15 hours.

36. The process according to claim 11, the volume ratio of the non-solvent used to the good solvent used is from 0.3 to 5, and wherein the non-solvent is added at a controlled speed in (iii) so that the addition of the non-solvent is completed in a period of time ranging from 20 min to 10 hours.

37. The process according to claim 11, wherein the anchoring agent is chosen from alkylaluminum compounds, alkyl lithium compounds, alkyl zinc compounds, alkyl boron compounds, and mixtures thereof.

38. The process according to claim 11, wherein the amount of the polymer used ranges from 10 to 45 wt %, based on the total weight of the composite catalyst.

39. The composite catalyst according to claim 2, wherein the support is an inorganic support chosen from magnesium dihalides, silica, alumina, zirconia, thoria, titania, silica-alumina, silica-magnesia, montmorillonite, and combinations thereof.

40. The process according to claim 11, wherein the support is an inorganic support chosen from magnesium dihalides, silica, alumina, zirconia, thoria, titania, silica-alumina, silica-magnesia, montmorillonite, and combinations thereof.

41. The composite catalyst according to claim 2, wherein said polymer layer is coated on the first catalyst-supported support.

\* \* \* \* \*

UNITED STATES PATENT AND TRADEMARK OFFICE
CERTIFICATE OF CORRECTION

PATENT NO. : 8,536,286 B2
APPLICATION NO. : 12/593239
DATED : September 17, 2013
INVENTOR(S) : Wenqing Wu et al.

It is certified that error appears in the above-identified patent and that said Letters Patent is hereby corrected as shown below:

In the Claims

In claim 12, column 31, line 15, "claim 8," should read --claim 10,--.

In claim 13, column 31, line 21, "claim 8," should read --claim 10,--.

In claim 14, column 31, line 26, "claim 8," should read --claim 10,--.

In claim 15, column 31, line 30, "claim 8," should read --claim 10,--.

In claim 16, column 31, line 40, "claim 8," should read --claim 10,--.

In claim 17, column 31, line 48, "claim 8," should read --claim 10,--.

In claim 18, column 31, line 56, "claim 8," should read --claim 10,--.

In claim 19, column 31, line 64, "claim 8," should read --claim 10,--.

In claim 20, column 32, line 1, "claim 8," should read --claim 10,--.

In claim 22, column 32, line 14, "claim 17," should read --claim 21,--.

In claim 23, column 32, line 16, "claim 17," should read --claim 21,--.

In claim 24, column 32, line 18, "claim 17," should read --claim 21,--.

In claim 25, column 32, line 22, "claim 17," should read --claim 21,--.

In claim 26, column 32, line 24, "claim 17," should read --claim 21,--.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,536,286 B2

In claim 27, column 32, line 26, "claim 17," should read --claim 21,--.

In claim 28, column 32, lines 29-30, "polyethylene having, comprising" should read --polyethylene, comprising:--.

In claim 35, column 33, line 7, after "according to claim 11,", insert --wherein--.

In claim 36, column 33, line 12, after "according to claim 11,", insert --wherein--.

In claim 40, column 34, line 11, "claim 11," should read --claim 10,--.